(12) United States Patent
Hart (10) Patent No.: US 7,494,315 B2
(45) Date of Patent: Feb. 24, 2009

(54) HELICAL TAPER INDUCED VORTICAL FLOW TURBINE

(76) Inventor: James R. Hart, 3612 Cheshire Ave., Carlsbad, CA (US) 92010

( * ) Notice: Subject to any disclaimer, the term of this patent is extended or adjusted under 35 U.S.C. 154(b) by 371 days.

(21) Appl. No.: 11/418,786

(22) Filed: May 5, 2006

(65) Prior Publication Data

US 2007/0258806 A1    Nov. 8, 2007

(51) Int. Cl.
*F03B 3/12* (2006.01)
(52) U.S. Cl. .................. 415/4.2; 415/4.4; 415/64; 415/71; 415/176; 415/907; 416/197 A
(58) Field of Classification Search ............. 415/4.2, 415/4.4, 64, 71, 176, 907; 416/197 A
See application file for complete search history.

(56) References Cited

U.S. PATENT DOCUMENTS

| | | | |
|---|---|---|---|
| 274,541 A | | 3/1883 | Zwiebel |
| 1,027,501 A | * | 5/1912 | Smith .................. 416/188 |
| 1,100,332 A | * | 6/1914 | Pearson ................ 416/175 |
| 1,519,447 A | * | 12/1924 | Fortier-Beaulieu ........ 415/186 |
| 1,697,574 A | | 1/1929 | Savonius |
| 1,766,765 A | | 6/1930 | Savonius |
| 3,941,504 A | * | 3/1976 | Snarbach ............. 416/197 A |
| 4,218,175 A | * | 8/1980 | Carpenter ............. 415/219.1 |
| 4,236,866 A | * | 12/1980 | Zapata Martinez ........ 415/4.4 |
| 4,293,274 A | | 10/1981 | Gilman |
| 4,357,130 A | | 11/1982 | Forrest |
| 4,652,206 A | | 3/1987 | Yeoman |
| 4,715,776 A | | 12/1987 | Benesh |
| 4,718,821 A | | 1/1988 | Clancy |
| 5,405,246 A | | 4/1995 | Goldberg |
| 6,015,258 A | | 1/2000 | Taylor |
| 6,036,443 A | | 3/2000 | Gorlov |
| 6,132,172 A | | 10/2000 | Li |
| 6,428,275 B1 | | 8/2002 | Jaakkola |
| 6,465,899 B2 | | 10/2002 | Roberts |
| 6,923,615 B2 | * | 8/2005 | Crinion .................. 415/4.1 |
| 6,935,841 B2 | | 8/2005 | Rainbow |
| 6,984,899 B1 | * | 1/2006 | Rice ..................... 415/4.2 |
| 7,040,859 B2 | | 5/2006 | Kane |
| 7,344,353 B2 | | 3/2008 | Naskali et al. |
| 2004/0061337 A1 | | 4/2004 | Becker |
| 2005/0106023 A1 | * | 5/2005 | Palley .................. 416/176 |

OTHER PUBLICATIONS

Mehta, R., et al. "Design rules for small low speed wind tunnels",. *Technical Notes, The Aeronautical Journal of the Royal Aeronautical Society*, 443-49 (Nov. 1979).

Nam, K., et al. "Stability of spiral wave vortex filaments with phase twists", *Physical Review—The American Physical Society*, 58(2):2580-85 (Aug. 1998).

Umur, H., et al "Laminar and turbulent forced convection in accelerating and decelerating curved flows", *Research Articles, Current Science*, 87(9):1237-43 (Nov. 2004).

(Continued)

*Primary Examiner*—Igor Kershteyn
(74) *Attorney, Agent, or Firm*—Gordon & Rees, LLP (57) ABSTRACT

A turbine generator system, having: a rotatable base; and a plurality of rotor vanes extending from the rotatable base, wherein each of the rotor vanes have helical tapered inner and outer surfaces, and wherein each of the rotor vanes is curved to catch flow perpendicular to the axis of rotation of the rotatable base and to direct the flow into a vortical flow between the inner surfaces of the rotor vanes.

10 Claims, 12 Drawing Sheets

OTHER PUBLICATIONS

Website on Windside Products at http://www.windside.com/products.html 1-3 (Sep. 2006).

Website on Windside Products Technical Data at http://www.windside.com/products.html 1- (Sep. 2006).

* cited by examiner

HELICAL TAPER INDUCED VORTICAL FLOW TURBINE

TECHNICAL FIELD

The present invention relates to wind turbine electric generator systems.

BACKGROUND OF THE INVENTION (a) General Background

A large number of existing turbine vane rotor designs take advantage of mechanical energy conversion processes using gases and fluid movement. Broadly speaking, there are turbine rotors comprised of one or more vanes, that rotate about a horizontal axes and also similar designs that rotate about a vertical axes. For example: "turbine rotor vane designs can be found in use on wind electrical generators and in various fluid pump designs for the work they produce because of the presence of kinetic energy that can be extracted from fluid and gas flows".

Familiar "wind turbine rotor vane designs" are comprised of two common opposing axes oriented counterparts. They convert force applied to the "rotor vanes" and spin on a horizontally oriented axis (horizontal axis machine types; hereinafter referred to as "HAWT"), or vertical axis machine types (hereinafter referred to as "VAWT") that spin on a vertically oriented axis. In either case, a component comprised of "shaped vanes" fashioned into a "rotor" turns when sufficient force is applied then transfers the resulting torque to a common shaft assembly, which in turn rotates an electric motor or a pump of some type. The purpose is usually to generate electricity or to move a fluid from point A to point B.

A device's operational axes orientation to the cross flow of a prevailing wind condition is defined by the principle axis of the "rotor's mechanical rotation" in relation to the horizon. Generally it is recognized that wind "blows across" the ground surface at various lower altitudes. An exception is vertically moving columns of air that are the result of more dramatic thermal changes in temperature. This causes the formation of natural phenomenon's like hurricanes, cyclones and tornadoes. In general the "Corriolis effect" demonstrates how air movement tends to behave in the environment. These contributing environmental factors define the motivating characteristics for either machine system types' working function.

(b) HAWT Machine Design and Operation

HAWT machine designs typically employ a conventional single or multi-bladed propeller design where the propeller (similar to an airplane propeller) is mounted to a shaft that is then connected to an electric motor. The device can also be equipped with brakes, gears and a pole mounting bearing assembly of some type so the devices "rotor, tail boom and motor housing assembly" can rotate freely to allow the entire machine to spin around on the mounting pole as required. In smaller versions of the device, the rotor spins, then the entire device spins around and is passively controlled to some degree by an extension with a "tail". In some cases, because of practical engineering issues a HAWT device may simply be affixed in a single direction, then mechanically moved to orient the "rotor" into the face of prevailing wind flow without the use of a tail boom apparatus.

The HAWT device is then mounted onto the top of a mast or post of "sufficient minimum height" so that the propeller of the device is positioned into a desired smoother airflow path that is above obstructions that cause turbulence. The mounting requirements may be self supporting or may require additional guyed wire supports for adequate structural stability.

HAWT machine designs employ propeller driven mechanical techniques that can suffer from numerous operating difficulties. For example, the propeller typically must be placed high above the ground (30' ft. to 300' ft. tall) i.e. in the path of "smooth flowing" prevailing winds for these design types to efficiently convert wind to mechanical energy without generating significant destructive forces. Such placement of these "propeller driven" wind turbine generator system designs makes it difficult to find a suitable installation site. Accessing the turbine for repairs is difficult because of the installed height requirements and high tip speed operation.

Additionally, HAWT type turbine generator systems can become structurally unstable in "seismically active" or "turbulent wind zones" because this system type, experiences increasingly complex compounding stresses on mechanical systems since they have a rotating propeller, then must also rotate the entire machine.

This stress is then transferred to other mechanical components as material stress and vibration. As the rotors "tip speed" increases (in some cases up to 275 mph) and as the size of the propeller increases, the rotating mass of this type of device is effected adversely by i.) high tip speed movement, ii.) significant rotor vane flexing under tension and, iii.) increased sensitivity to harmonic vibration that causes eventual breakage. Moreover, the quickly moving tips of the propellers also makes this rotor vane type prone to break easily when hit by airborne debris, such as snow, ice, heavy rains and in heavy turbulent airflow conditions unless the machine is stopped mechanically or lowered to the ground.

When a rotor vane breaks of fractures the entire machine becomes un-balanced, possibly during high speed operation and in extreme cases self destructs as pieces fly off. For proper operation the propeller face must be constantly re-directed to face "into" the prevailing wind direction as associated weather conditions change for the same reasons a table fan must be re-oriented to blow in a desired direction. The adverse effect of the mechanical stress imposed on this device type is the same as if a person was to try spinning in circles while holding a running table fan and is compounded if the table fan is also in air circulating mode.

A further mechanical engineering challenge that propeller-driven machine (HAWT machine types) designers face, is that the machine tends to lose "useful" energy conversion efficiency quickly in turbulent flow conditions. This is because this type of device is subject to "yaw, pitch and furling stresses" constantly. When air flow becomes rough, destructive forces develop under certain conditions along the rotor vanes and other rotating components.

These forces distort and flex components violently in higher wind speed conditions and create stress fractures in the rotor's vane materials (usually fashioned of wood, metal or fiberglass resin materials). Also mechanical motor shafts and mounting hubs fatigue over time because of highly leveraged bending forces that eventually cause premature mechanical failure.

Unlike airplanes that spend a significant portion of time in calmer and less dense air, wind turbine machines are subjected to more unpredictable variations in turbulent airflow because they are always close to the ground by comparison. In conclusion; a basic operating requirement is that the HAWT machine type works best in a free air environment at a high RPM where the "lift based" design principles flourish.

The mechanical advantages of HAWT machine type propeller designs are that they;

(i) convert wind force to mechanical energy very efficiently when placed in smooth airflow conditions and because of their aerodynamic "lift based" principle of operation, similar to an airplane wing or propeller.

(ii) they can be readily made in numerous sizes including extremely large machines with sufficient quality of material and engineering expertise.

(iii) They can produce comparatively greater power yields than other types of environmentally powered devices over the same period of time. For example: As compared to photovoltaic technologies that are limited to producing energy only during sufficient light exposure periods.

The mechanical disadvantages in HAWT machine type propeller driven designs are that they;

(i) Require braking systems of either a mechanical or electronic shorting type that wear or fail because of heat and stress in higher speed wind conditions and therefore must dissipate otherwise useful mechanical energy, (ii) Generate a "flapping" or "wooshing" acoustic noise since they operate on the same mechanical principle as airplane propellers, helicopter rotors, and table fans; and (iii) Mechanical components are subjected to extreme axial stress and, bearing loads. In some HAWT device versions stress is also transferred to gearing boxes that fail. The effects of inertia and gravity on the rotating mass tend to pull the device out of balance. Rotor vanes tend to break easily.

(iv) HAWT type machines appear cosmetically unsightly to the majority of casual observers and therefore are considered impractical for installation in visible and populated areas for architectural reasons.

(v) HAWT machine types are difficult to install in populated areas because of complex issues that have developed for permitting, safety and practical application in building construction due to installed height requirements.

(vi) HAWT "wind power machine" designs are a single purpose device and cannot be multi purposed to operate in fluid based applications.

(vii) HAWT machine types cannot safely operate substantially beyond their horizontal axis orientation unless motor driven, like a helicopter rotor for example and they can require non-productive furling mechanisms such as joints, hinges, hydraulics or spring loaded components to avoid mechanical damage (c) VAWT Machine Design and Operation Alternately, turbine vanes may instead rotate about vertical axes (VAHT machine types, hydroelectric rotors, certain water pump designs and derivative Da Vinci and Archimedes type screws. The basic principle of operation is the same as for weather anemometers although certain manufactured and prototyped "rotor vane design models" use "lift-based" instead of "drag-based" principles. Common examples include basic Savonius (drag based) and Darrieus-type (lift based) wind vane designs while others include boat sail design adaptations using a simple helical twist method of shaping the rotor vanes.

These types of "air-driven wind vanes" have the advantage of operating independently of prevailing wind directions and generally demonstrate higher mechanical reliability characteristics to their HAWT machine type counterparts. They only require one axes of rotation to function. The rotor vanes in most cases do not have to flex as part of normal operation. These "vertical axis oriented" machine types do not need to be constantly re-positioned since certain versions of this type of "rotor vane" can catch wind throughout any 360 degree horizontal or vertical airflow direction. As such they can also take advantage of vertical air movement caused by thermal updrafts. An example is typical roof ventilators.

Furthermore; certain VAHT machine types are also self starting in "low wind speed conditions" (Savonius types) like their HAWT counterparts but can produce "more desirable smooth torque" at lower cut in wind speeds. So in general they exhibit desirable mechanical characteristics capable of more easily overcoming the resistance of bearings, electric motors, magnetic field hysteresis drag, or mechanically actuated pumps in low wind energy circumstances. This benefit can result in longer operating times since the device can reach critical cut in speeds with less wind and therefore may operate for longer periods than an equivalent HAWT type. VAHT machine types can also operate over a wider demographic area since installation height and turbulent flow conditions do not impact their operational cycles and reliability as much as their horizontal axes counterpart.

Certain VAHT rotor vane designs typically do not require braking mechanisms like HAWT type machine rotors because inherent drag characteristics naturally limit relative rpm and tip speeds which tend to be substantially less and rpm tends to remain proportional to wind speed. In conclusion certain VAHT type machines take advantage of turbulent air flows and compressible flow to reach critical "cubed" power values available for harvesting from wind since they benefit from but do not require "free air" environments to operate. They also have the ability to create their own "wind tunnel effect" and take advantage of thermal up drafts as well as cross flow wind resources.

Finally, certain VAHT type machines incorporate hybrid rotor vane models that take advantage of both "drag based" and "lift based" characteristics along with bio mechanical design and wave front propagation methods to produce a vortical flow which we will describe and illustrate in detail as an implementation of HTI-VFT™ process technology The mechanical advantages of VAHT machine types are that they;

(i) Certain VAHT machine types exclude braking mechanisms because certain types naturally limit RPM relative to wind speed because of drag.

(ii) Certain machine types can be designed to operate with extremely low acoustic emissions (in some cases silent to the observer) suitable for populated areas and building integrated installation.

(iii) VAHT machine types have a much smaller rotating mass radius and comparative rotating speed for a given power range as compared to their counterpart and therefore gravitational force effects that could hamper device operation are less relevant than for HAWT machine types. For Example the singular axes of rotation for VAWT designs eliminates variables that are a normal part of HAWT design operation.

(iv) Certain VAHT type machines can appear aesthetically more appealing with a more familiar appearance to the observer that is comparable to lighting and flag poles, tall buildings, or naturally occurring shapes such as pine trees and water falls.

(v) Certain VAHT machine types are suitable for populated areas because they are quiet and can be integrated to existing building designs more easily because they can operate in the more turbulent airflow at extremely low installed heights and can be safely mounted directly to industry standard pole types without additional guy wire supports and remain reliable in operation.

(vi) Certain VAHT machine types can be modified to perform work in fluids such as water in the same manner as hydroelectric generator operating principles. For example the HTI-VFT™ application for a wind powered system that is described further in this document.

(vii) Certain VAHT machine types can effectively operate in any arc within 360 degree spherical axes of orientation, including horizontal or upside down.

The mechanical disadvantages of certain VAHT machine types:

(i) Lower energy conversion efficiencies when compared to HAWT machine type production values where ideal smooth airflow conditions can be found.

(ii) In some cases mechanical failure is still a problem because of the tendency of the machine to generate destructive harmonic resonance due to its "lift based" design principles (Darrieus).

(iii) Certain VAWT machine types must also have an electrical starting system to initiate operation cycles and still require guyed wire supports for stability (Darrieus-machine types).

(d) Need for the Present Invention

What is instead desired is a "multi purpose rotor" and "turbine generator system" that efficiently harvests energy from air or fluids approaching the turbine rotor vanes from any direction and mounted in any orientation required. In addition, it is especially desirable to have a turbine generator system that operates at both low and high pressure flows (and at variable flow pressures). It is desirable to have a turbine generator system that operates effectively in "turbulent flow conditions" and that can be mounted much lower to the ground than propeller driven designs It is also desirable to have a turbine generator system that is as "silent" as possible during normal operation. Additionally, it is desirable to have a turbine generator system that can house various electronic sensing, communications and measurement devices and can also operate either a "fluid-type" or "airfoil-type" motivated system without the need for additional outboard housings.

Finally it is desirable to have a turbine rotor design with desirable self-balancing gyroscopic characteristics. A novel fundamental industrial design aspect that consummately describes the engineering approach is that this and the relational methodologies provides for a parametrically scalable CAD/CAM development and production model that is mass-producible in virtually any practical size from less than three feet to more than 120 feet in height.

SUMMARY OF THE INVENTION

The present invention described provides a turbine generator system, having: a rotatable base and a plurality of rotor vanes that react as air or fluid capturing vanes extending from the rotatable base. In typical use, the rotor vanes extend inwardly toward the base center and the rotor vanes and rotatable base rotates about a vertical axis passing through the center of the device. In the illustrated embodiments, the present device has two rotor vanes.

It is to be understood that the present invention is not so limited and that other designs including more than two rotor vanes are also covered within the scope of the present invention.

Each of the rotor vanes has "helical tapered sweep" inner and outer surfaces. As will be explained, the rotor vanes are curved to catch flow perpendicular to the axis of rotation and to direct this flow to form a "rising pressurized vortex" between the inner surfaces of the rotor vanes. The helical tapered inner and outer surfaces of the rotor vanes are centered about the axis of rotation of the "rotatable base". As a result, the vortical flow is also centered along the axis of rotation of the rotatable base.

As will also be explained, the shape of the rotatable base also assists in the creation of this vortice. Specifically, the shape of the rotatable base directs air flow inwardly and upwardly along the axis of rotation of the rotor vanes, and into the interior region of the "rotor vanes" to enhance the "vortical flow characteristics".

An advantage of the present invention is that the shape of its "rotor vane design" (and its integrated base design) produces a "continuously rising vortical flow" centered about the central rotational axis of the turbine rotor vane assembly. Specifically, the present turbine rotor vanes (and integrated rotatable base) are specifically shaped and positioned such that a "cross wind" approaching from any direction will cause the rotor vanes to turn, which will generate a "vortical" (i.e. "whirlpool") type of flow in the center of the device.

The creation of such a vortical flow produces a region of rising pressurized flow that acts outwardly against the interior of the rotor vanes which assists in causing the turbine rotor and rotatable base to spin and thus develop smooth torque. As a result, the present turbine rotor assembly incorporating the combined rotor vanes and rotatable base is considerably more efficient than comparable vertical axis designs that simply turn because of "flow drag" or "lift induced" principles alone. Rather, the present invention has the further advantage of creating a vortical flow (i.e. a "whirlpool") along its center which also assists in causing the turbine generator's rotor vanes and rotatable base to spin smoothly in either low or high flow pressure conditions.

As a result, the present invention harvests energy regardless of the prevailing flow direction that approaches the turbine system. This provides an advantage over horizontal axis of rotation propeller designs which must be constantly repositioned to face into the direction of flow.

As mentioned above, in optional aspects of the present invention, the rotatable base is specifically shaped to catch flow perpendicular to the axis of rotation and to direct the flow along the axis of rotation of the rotatable base. As such, directional flows approaching the "convex cone" of the turbine from any direction, is urged inwardly (away from the conical cone) into the center of the device. In one embodiment, the rotatable base may have a concave surface from which the plurality of rotor vanes extends. When wind hits the base, the curved (or otherwise angled) surface of the base deflects the flow inwardly into the "flow vortice".

Directing the flow inwardly along the axis of rotation away from the rotatable base adds higher pressure uni-directional flow into the rotor vanes, thus causing the vortical flow to occur over time (since flow pressure exits at the other end of the vortice, being at the open exhaust flow end of the rotor vanes).

In optional aspects of the invention, the spacing between the rotor vanes spirals away from the rotatable base and increases then decrease proportionally along a swept helical arc shape. This progressive widening and narrowing of the distance between the interior trailing edge of the rotor vanes and a tapered center shaft (as the flow pressure moves along the axis of rotation away from the rotatable base) creates a "venturi" effect. This venturi effect has the advantage of creating a region of low air pressure some distance away from the rotatable base near the center axis of rotation. Such a low pressure region (at the upper end of the vortice, near the exhaust ends of the rotor vanes) helps to draw flow inwardly from the bottom end of the vortice (at the bottom end of the vortice, near the rotatable base). As such, the venturi helps to increase the smoothness and pressure of the vortical flow inside the rotor.

In various aspects of the invention, the "helical tapered inner and outer surfaces" of the rotor vanes have different "radii of curvature". In addition, the inner and outer surfaces of each rotor vane are preferably disposed on opposite sides of an axis of rotation of the rotatable base at a location where the rotor vanes contact the rotatable base.

In further aspects of the invention, the rotatable base includes a rotor assembly therein. Moreover, in optional aspects of the invention, a flywheel is disposed within the rotatable base. As will be shown, a flywheel effect of the rotatable base because of its heavier mass density has the advantage of permitting the present turbine generator system to operate efficiently at variable or smooth periodic flow pressures.

DETAILED DESCRIPTION OF THE DRAWINGS

Figure 1:
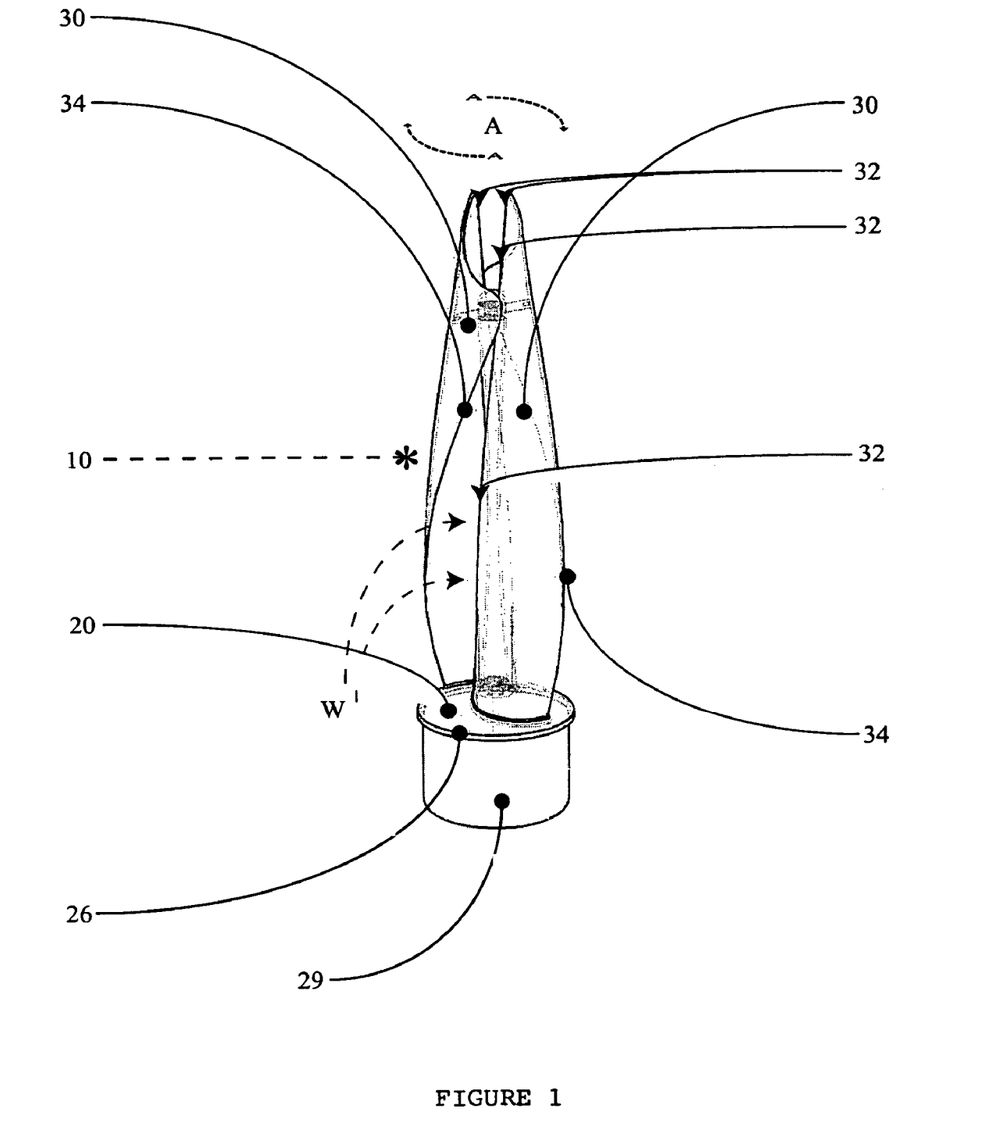
FIG. 1 is an assembled perspective view of the turbine generator system.

The present invention provides a novel turbine generator system 10. As seen in FIG. 1, turbine generator system 10 includes a rotatable base 20, and a plurality of rotor vanes 30 extending from rotatable base 20. Each of rotor vanes 30 has a helical tapered inner surface 32 and a helical tapered outer surface 34. The top ends of rotor vanes 30 may optionally be attached together by a member 40 (positioned at the top of a mast 35).

Figure 2:
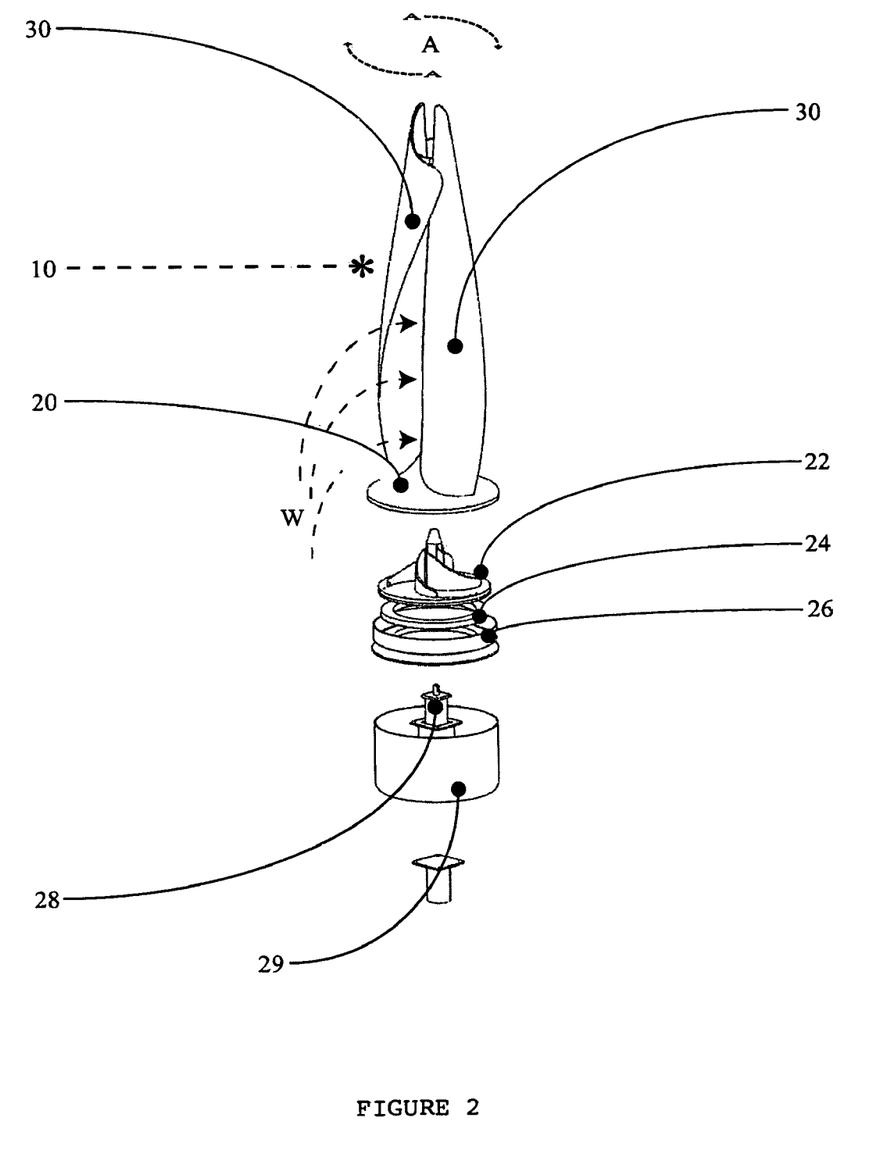
FIG. 2 is an exploded perspective view of the turbine generator system.

FIG. 2 is an exploded view of one embodiment of the invention showing additional components disposed under base 20. Specifically, a weighted flywheel base 22, an optional plurality of magnetic repulsion rotor/base support surfaces 24, cover extension 26, geared electric generator motor 28 and cover 29 are shown.

The operation of turbine generator system 10 can be understood by viewing the remaining FIGS. 3 to 11 together, as follows.

Figure 3:
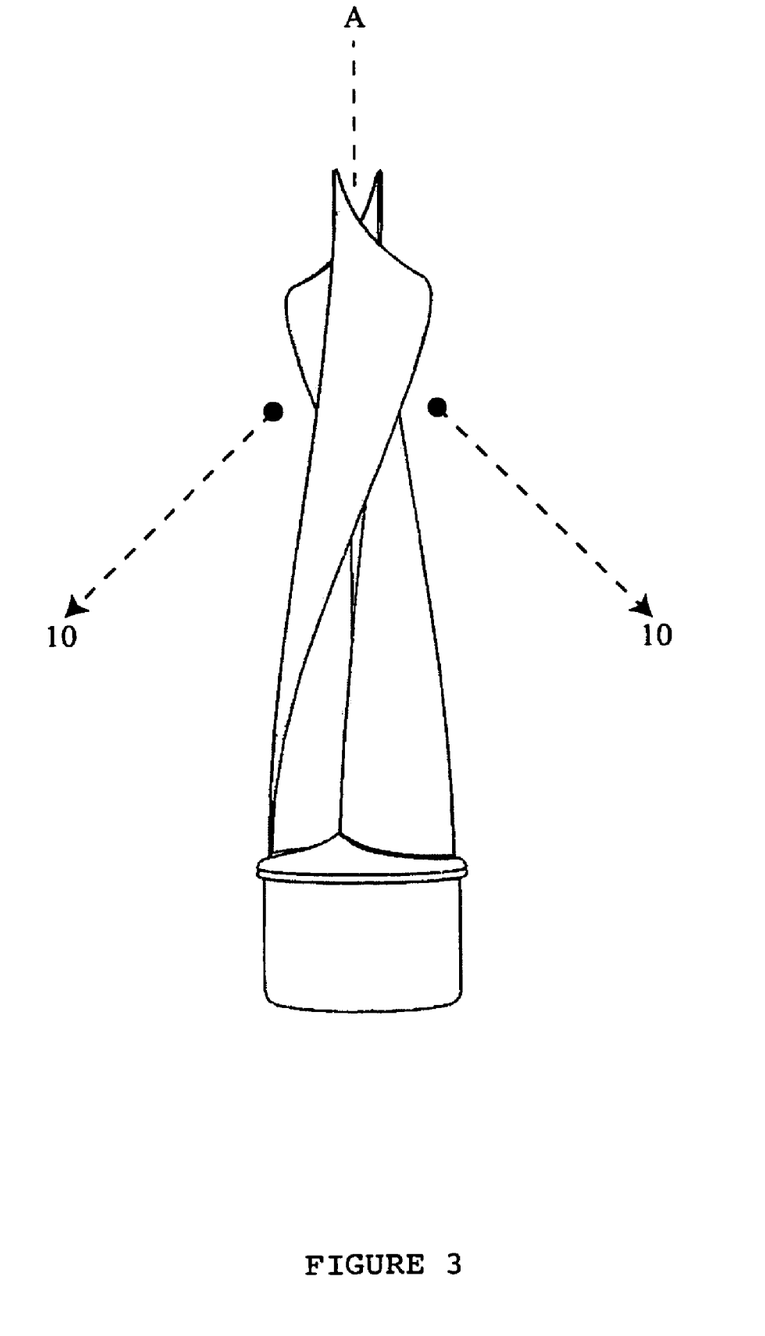
FIG. 3 is a side elevation view of the turbine generator system with the rotor vanes at a first position.
Figure 4:
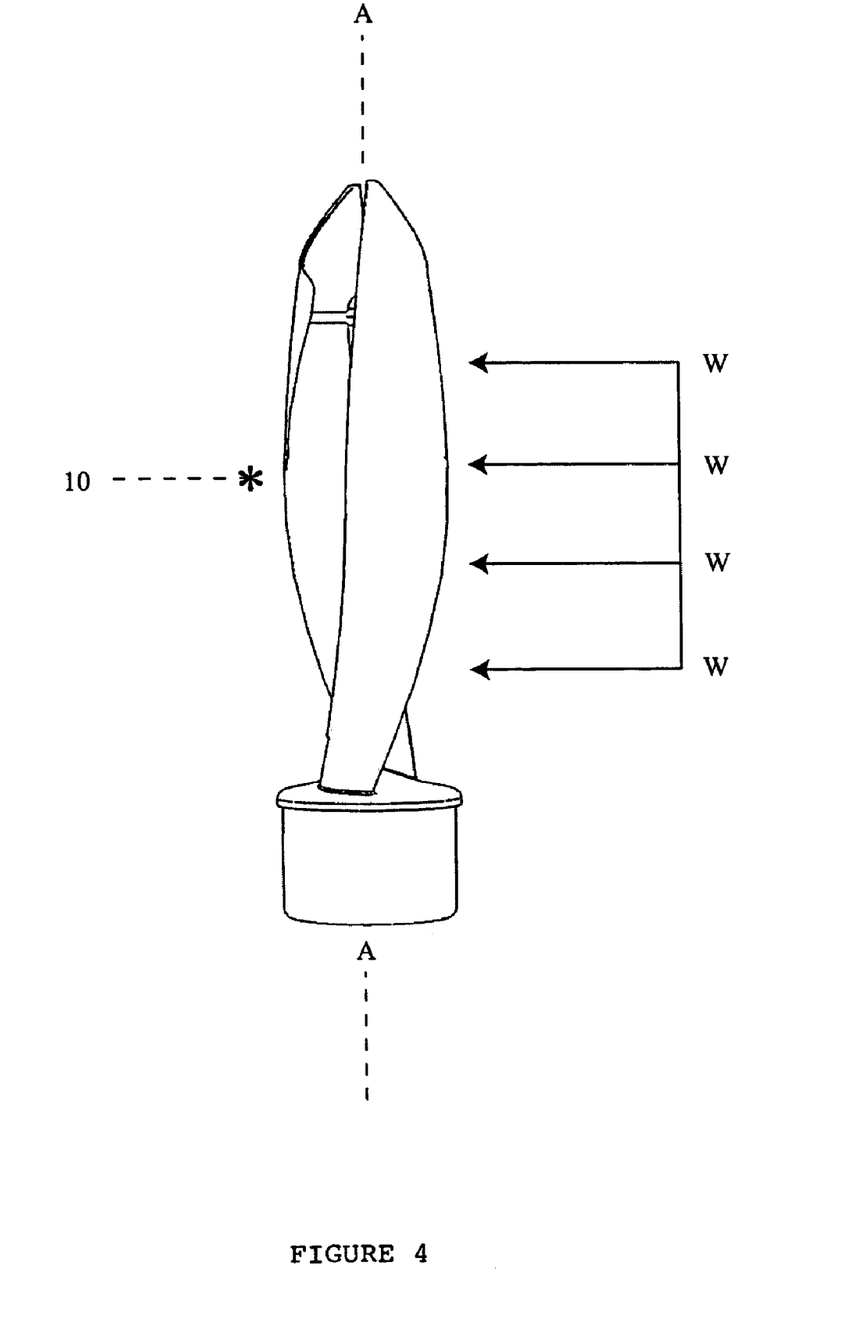
FIG. 4 is a side elevation view of the turbine generator system with the rotor vanes rotated to a second position.
Figure 5:
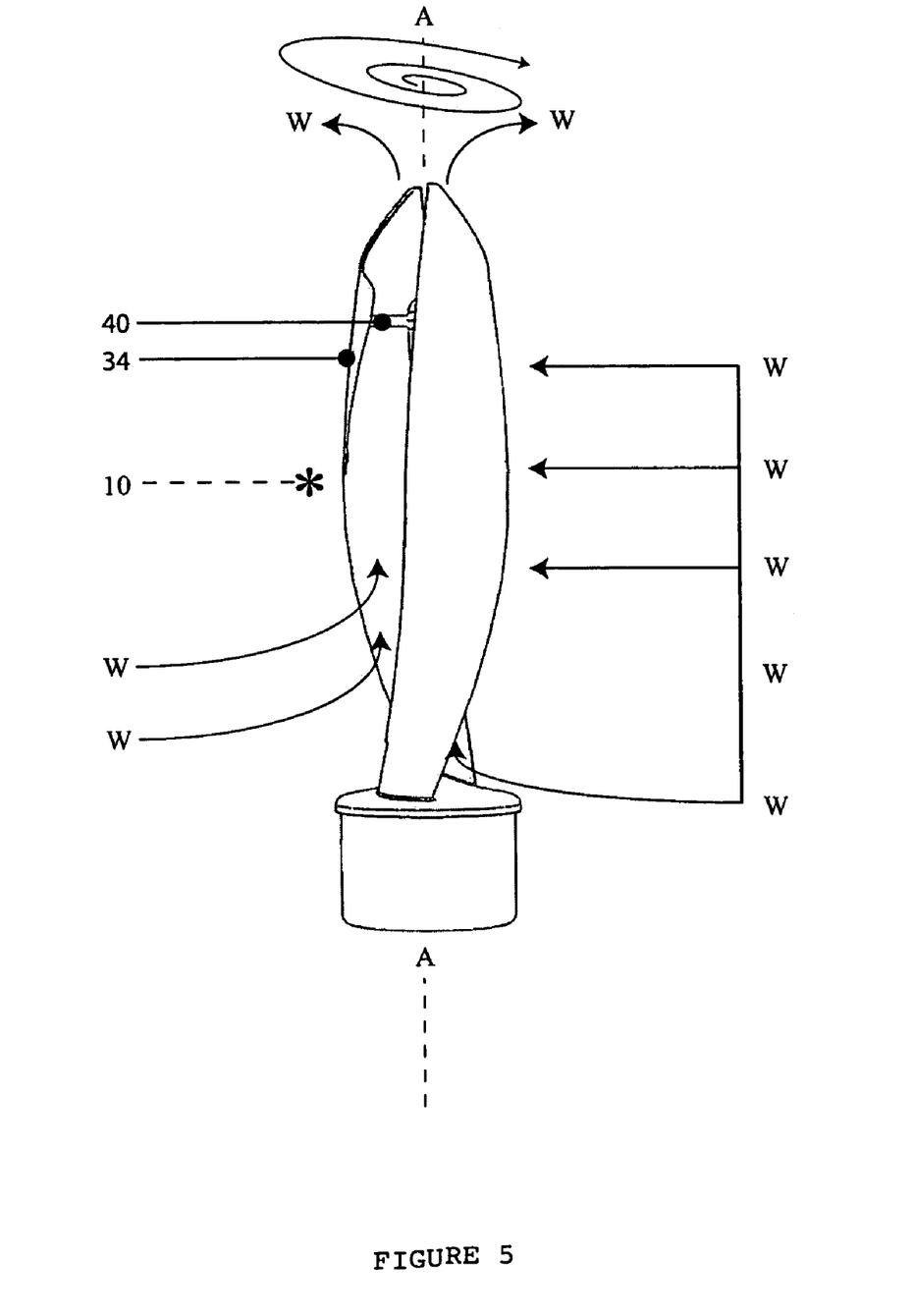
FIG. 5 is a side elevation view of the turbine generator system with the rotor vanes rotated to a third position.

FIGS. 3 to 5 illustrate the turbine generator system 10 rotated to different positions about its axis of rotation A.

Figure 6:
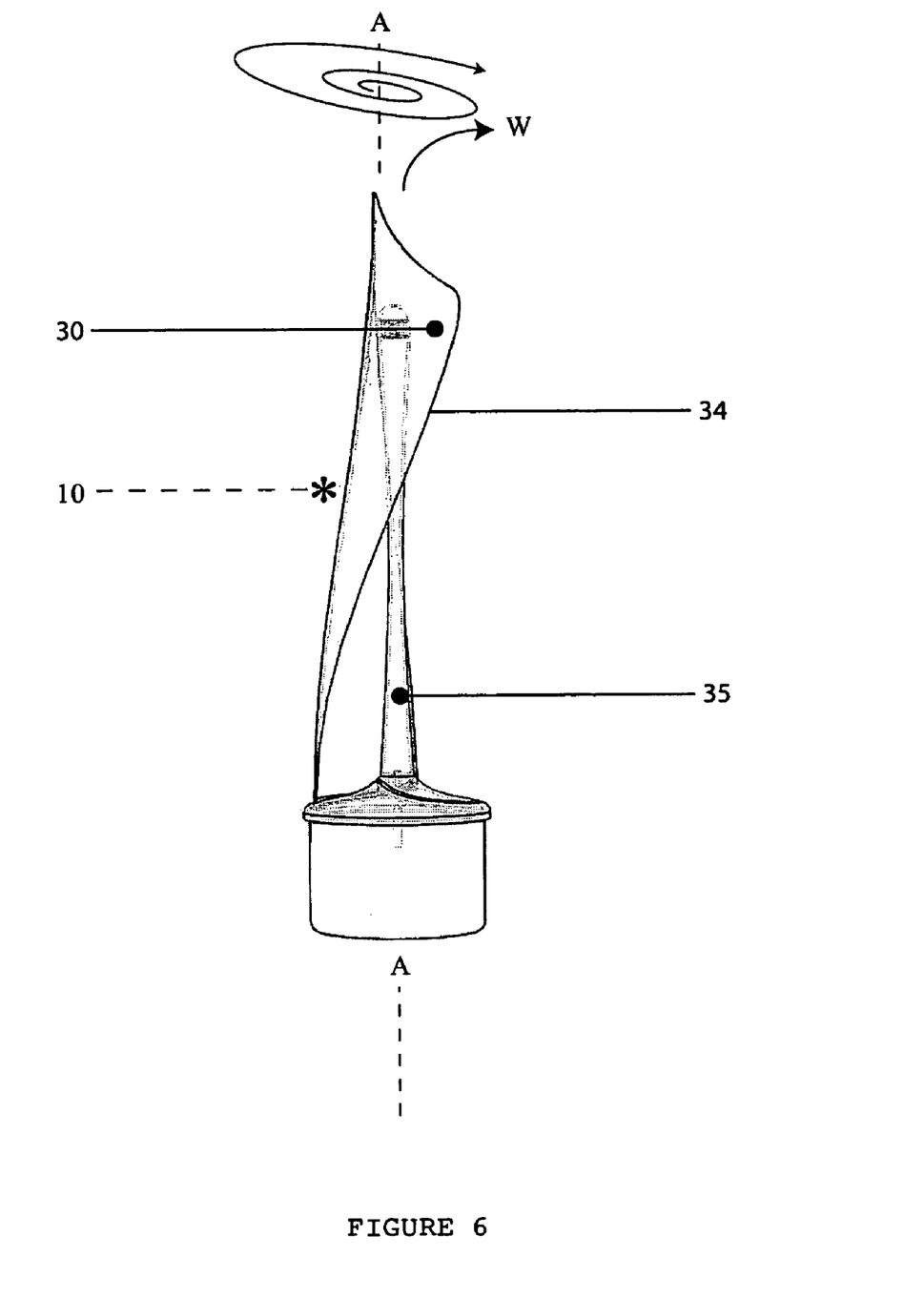
FIG. 6 is a view similar to FIG. 3, but with one vane removed
Figure 7:
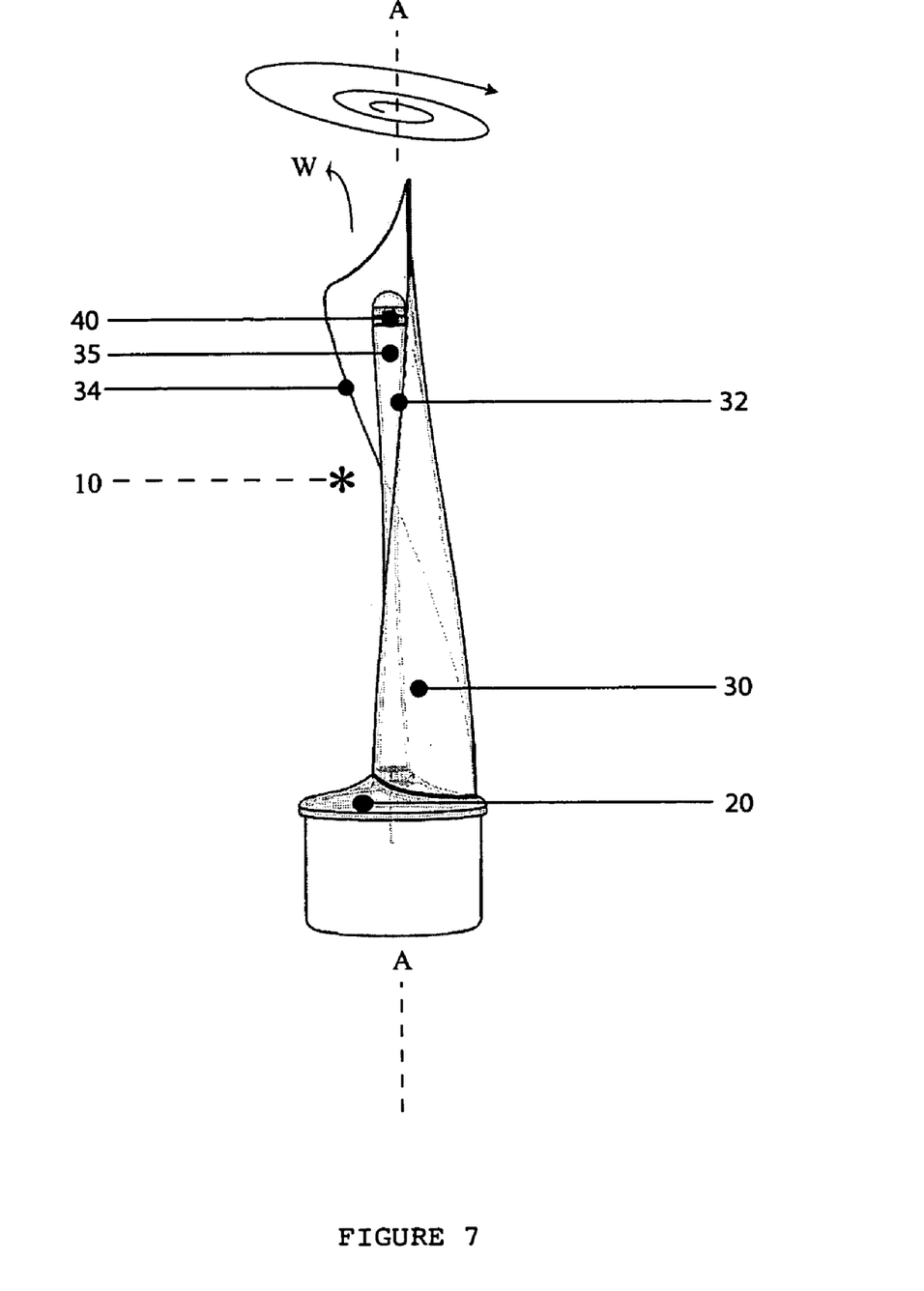
FIG. 7 is also a view similar to FIG. 3, but with the other vane removed.
Figure 8:
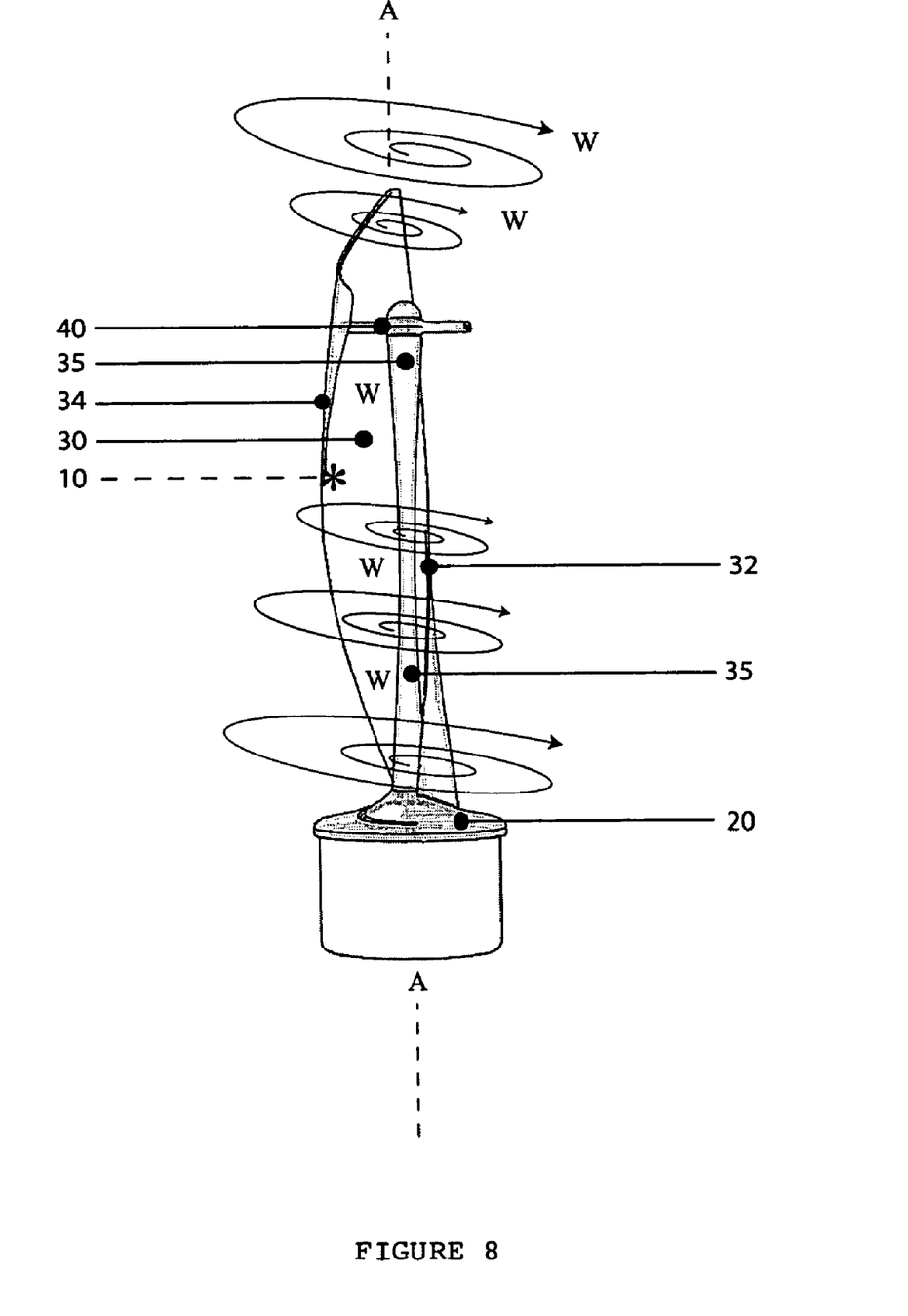
FIG. 8 is a view similar to FIG. 5, but with one vane removed.
Figure 9:
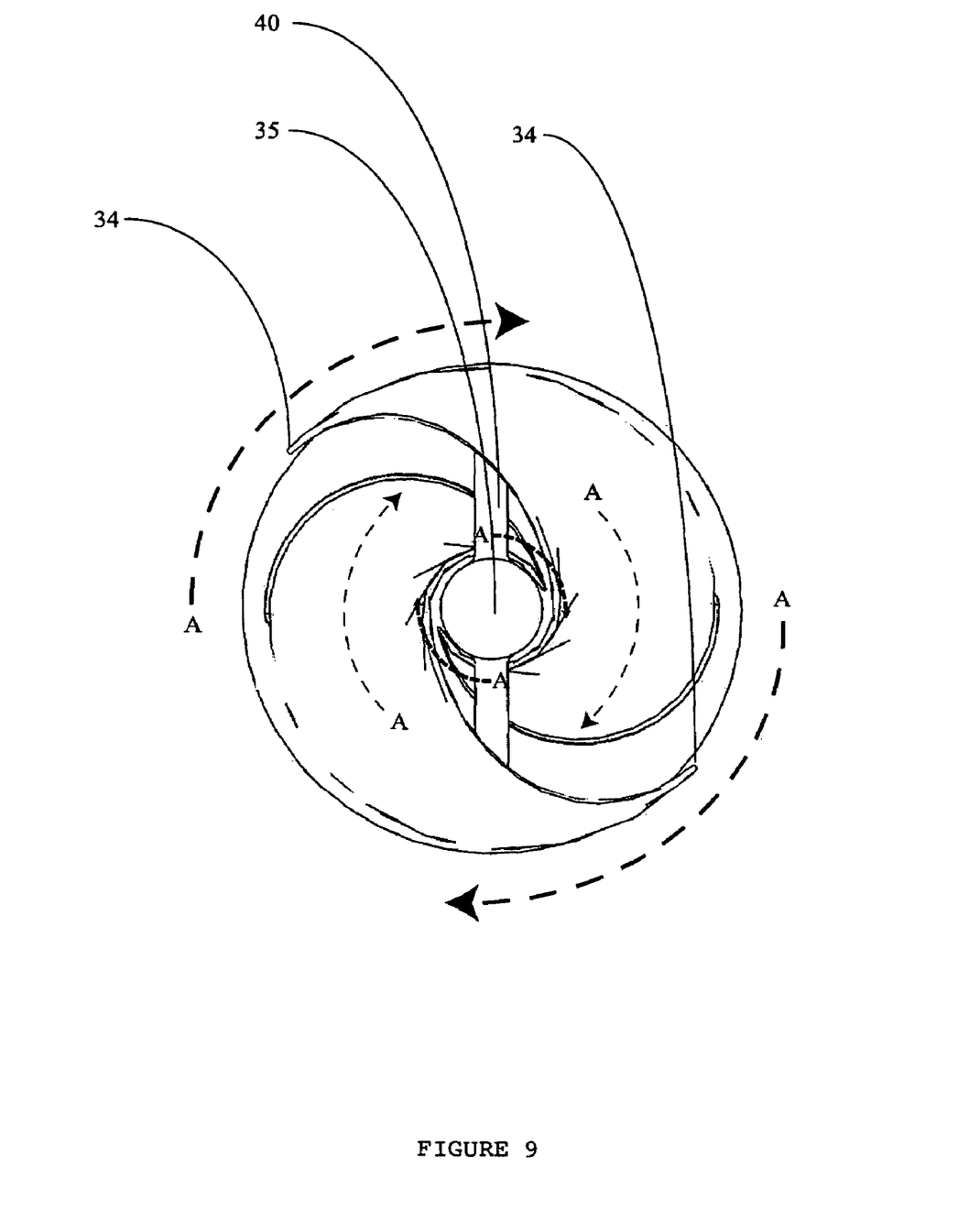
FIG. 9 is a top plan view of the turbine generator system.

FIGS. 6 to 8 show turbine generator system 10 with one vane 30 removed to show the inner design of the system. A tapered center mast 35 can also be seen. FIG. 9 illustrates a top plan view thereof.

Figure 10:
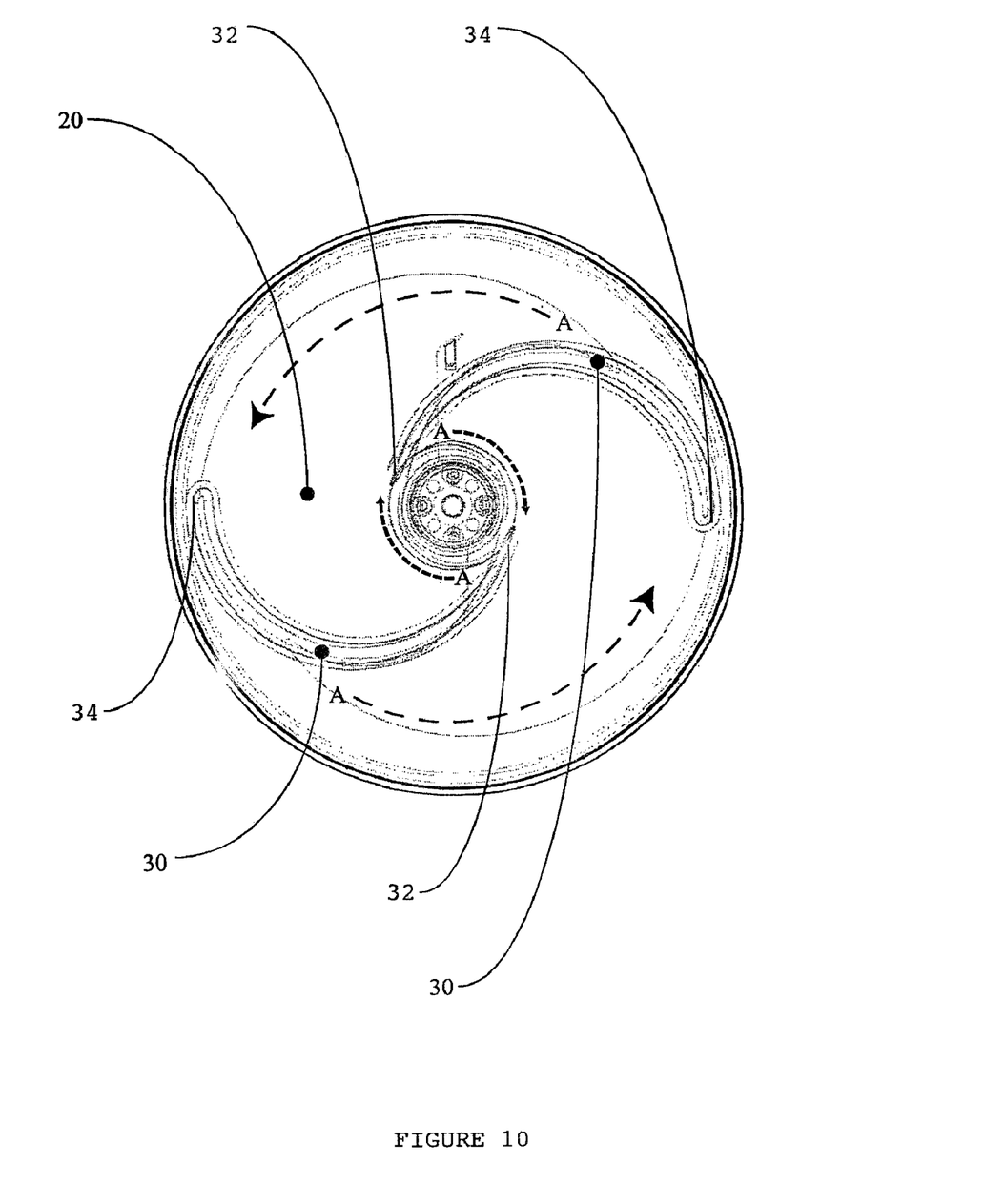
FIG. 10 is a top sectional plan view taken along line 10-10 in FIG. 3.

As can be seen in FIG. 10, the helical tapered inner surfaces 32 and outer surfaces 34 of rotor vanes 30 are centered about axis of rotation A. Moreover, the helical tapered inner surfaces 32 have a shorter radius of curvature than the outer surfaces 34 of rotor vanes 30.

As can be seen in the attatched FIGS., each of rotor vanes 30 is curved to catch flow (wind W, fluid F) perpendicular to the axis of rotation A of rotatable base 20. As can be seen by arrows W/F, the flow is channeled to form a vortical flow V between inner surfaces 32 of rotor vanes 30. Rotor vanes 30 will thus rotate in direction R. As can also be seen, the formation of the vortice V is centered on the axis of rotation A of rotatable base 20. Vortice V thus propagates along axis of rotation A.

As can be seen in FIG. 4, rotatable base 20 is shaped to catch flow (wind W, fluid F) perpendicular to the axis of rotation A and to direct the flow (wind W, fluid F) inwardly along the axis of rotation of the rotatable base. In one embodiment, rotatable base 20 has a concave surface (as illustrated) from which the pluralities of rotor vanes 30 extend. It is to be understood that other shapes for rotatable base 20 are also contemplated within the scope of the present invention.

The specific advantage of rotatable base 20's concave surface is that it directs flow into the bottom end of the vortice, thus initiating the vortical flow. Thus, pressure flow enters from any side of the turbine generator system 10 near where the rotor vanes 30 are attached to base 20, and directs flow where it exits between the opposing ends of rotor vanes 20 as shown by arrows W/F. As such, rotatable base 20 receives low pressure cross flow and converts it into high pressure vortical flow.

FIG. 10 shows further details of the invention in which inner surfaces 32 and outer surfaces 34 of each vane 30 are disposed on opposite sides of axis of rotation A at a location where the rotor vanes contact the rotatable base.

In accordance with a preferred embodiment of the invention, the spacing between inner surfaces 34 of rotor vanes 30 increases as the distance away from rotatable base 20 increases then decreases moving along tapered center shaft 35. Preferably, the spacing between the inner surfaces 34 of rotor vanes 30 spirals in a natural logarithmic defined helix as distance away from the rotatable base 20 increases.

In various embodiments, rotor vanes 20 is being made of mass producible resin injection castings and can also use fiberglass, carbon fiber reinforcing fabrics, or various castable metal alloys.

Returning to FIG. 2, convex conical rotor base can be seen. The higher density object 26 provides a balancing "flywheel inertia" effect that stabilizes the rotor vanes 30 at different wind speeds, and increases relative smoothing of torque on center shaft 35. An optional characteristic is that additional balanced discs may be incorporated including fluid filled or magnetically repulsive characteristics.

In accordance with an embodiment of the present invention, center mast 35 may be logarithmically tapered. Most preferably, center mast 35 has a natural logarithmic tapered shape. This provides the advantage of passing the pressure of the vertical flow between rotor vanes 30 in a progressive fashion to normalize internal vortical flow pressure along with resonant harmonics in the system relative to rotatable base 20 and the opposite end of the vortice. This also balances the compressible flow characteristics, through the inlet and exhaust areas of rotor vanes 30 relative to the middle, and thus optimizes flow at various flow pressures.

Figure 11:
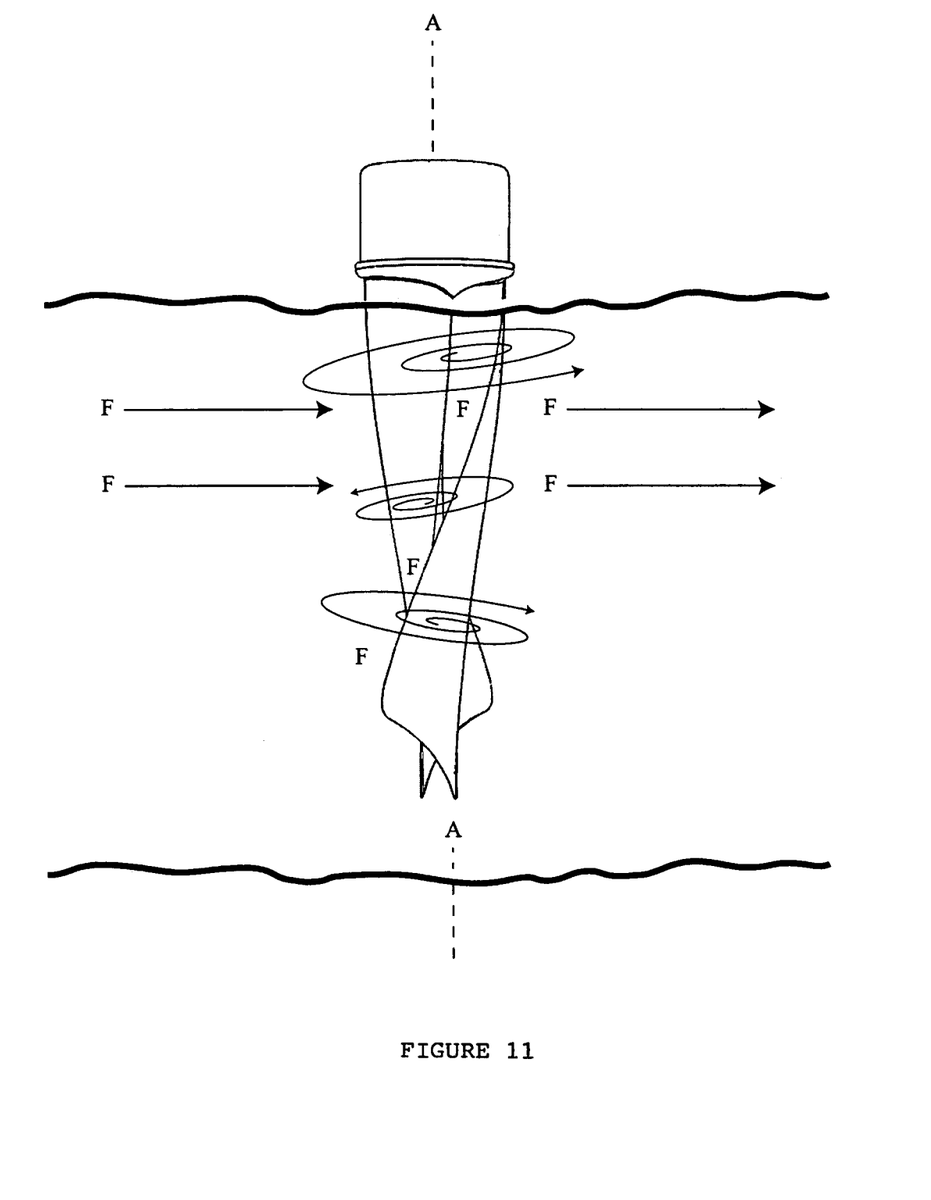
FIG. 11 is an illustration of the turbine generator system used in water.

FIG. 11 illustrates system 10 positioned upside down in water. Fluid flow F causes the system to operate similar to the manner as described above with respect to air flow W. The portion of system 10 positioned below the water level in dotted lines.

Figure 12:
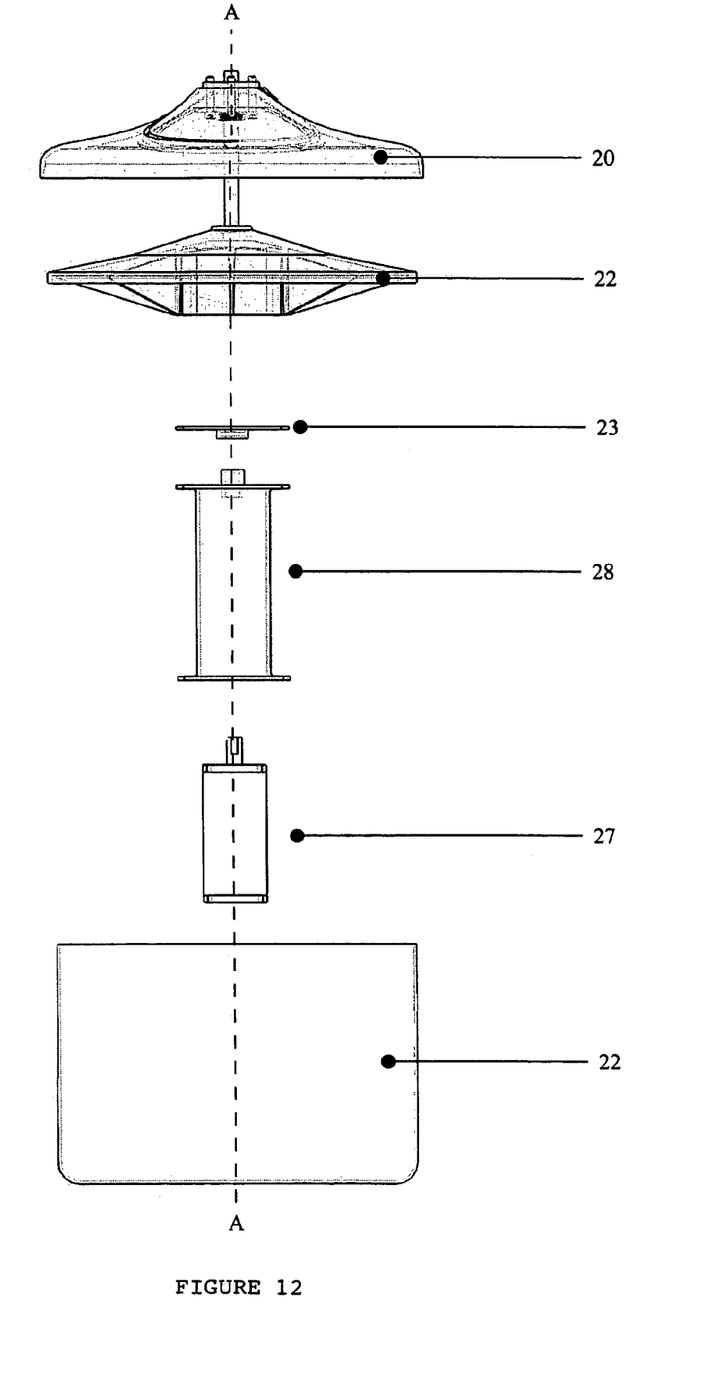
FIG. 12 is an exploded side elevation view of components in the base of the device.

FIG. 12 illustrates further details of the base assembly, being: base plate structural bearing/axle housing 22, upper bearing thrust plate 23, support mount 28, electrical generator 27 and cover 29 are shown.

What is claimed is:

1. A turbine generator system, comprising:
   a rotatable base;
   a center mast extending from the rotatable base; and
   a plurality of rotor vanes extending from the rotatable base, wherein each of the rotor vanes have helical tapered inner and outer surfaces, and wherein each of the rotor vanes is curved to catch flow perpendicular to the axis of rotation of the rotatable base and to direct the flow into a vortical flow between the inner surfaces of the rotor vanes, wherein the tapered inner surfaces of the rotor vanes have a shorter radius of curvature than the tapered outer surfaces of the rotor vanes, and wherein the spacing between the tapered inner surfaces of the rotor vanes and the center mast forms a venturi along the axis of rotation of the rotatable base.

2. The turbine generator system of claim 1, wherein the rotatable base is shaped to catch flow perpendicular to the axis of rotation of the rotatable base and to direct the flow along the axis of rotation of the rotatable base.

3. The turbine generator system of claim 1, wherein the rotatable base has a concave top surface from which the plurality of rotor vanes extend.

4. The turbine generator system of claim 1, wherein the vortical flow is propagated along the axis of rotation of the rotatable base.

5. The turbine generator system of claim 1, wherein the helical tapered inner and outer surfaces of the rotor vanes are centered about an axis of rotation of the rotatable base.

6. The turbine generator system of claim 1, wherein the inner and outer surfaces of each rotor vane are disposed on opposite sides of an axis of rotation of the rotatable base at a location where the rotor vanes contact the rotatable base.

7. The turbine generator system of claim 1, wherein spacing between the rotor vanes spirals in a natural logarithmic defined helix as distance away from the rotatable base increases.

8. The turbine generator system of claim 1, further comprising a flywheel positioned under the rotatable base.

9. The wind turbine of claim 1, wherein the rotatable base further comprises: a rotor assembly therein.

10. The turbine generator system of claim 1, wherein the center mast is logarithmically tapered.

* * * * *